(12) United States Patent
Bilotto et al.

(10) Patent No.: US 10,113,310 B2
(45) Date of Patent: Oct. 30, 2018

(54) COATING MATERIAL FOR ACHIEVING SOUND-DAMPENING AND METHOD FOR THE SAME

(71) Applicant: Blue Angel Paint and Coatings, Ltd., Dyer, IN (US)

(72) Inventors: John Bilotto, Crown Point, IN (US); Richard J. Pulciani, Sr., Manhattan, IL (US); Richard J. Pulciani, Jr., Joliet, IL (US); R. Kerry Lane, Pryor, OK (US)

(73) Assignee: Blue Angel Paint and Coatings, Ltd., Dyer, IN (US)

( * ) Notice: Subject to any disclaimer, the term of this patent is extended or adjusted under 35 U.S.C. 154(b) by 116 days.

(21) Appl. No.: 13/966,413

(22) Filed: Aug. 14, 2013

(65) Prior Publication Data

US 2013/0330565 A1    Dec. 12, 2013

Related U.S. Application Data

(62) Division of application No. 13/246,468, filed on Sep. 27, 2011, now Pat. No. 8,512,814.

(60) Provisional application No. 61/442,425, filed on Feb. 14, 2011.

(51) Int. Cl.
   *E04B 1/84*   (2006.01)
   *E04B 1/82*   (2006.01)
   *E04B 2/74*   (2006.01)
   *C09D 5/02*   (2006.01)

(52) U.S. Cl.
   CPC ............. *E04B 1/84* (2013.01); *C09D 5/024* (2013.01); *E04B 1/82* (2013.01); *E04B 2/7409* (2013.01); *E04B 2/7457* (2013.01); *Y10T 428/3183* (2015.04); *Y10T 428/31826* (2015.04); *Y10T 428/31924* (2015.04)

(58) Field of Classification Search
   CPC .......... C09D 5/024; E04B 1/84; E04B 2/7457; E04B 2/7409; E04B 1/82
   See application file for complete search history.

(56) References Cited

U.S. PATENT DOCUMENTS

| | | | |
|---|---|---|---|
| 4,346,782 A * | 8/1982 | Bohm | B05D 7/54 181/207 |
| 2004/0167271 A1* | 8/2004 | Maeyama | C09D 121/00 524/513 |

\* cited by examiner

*Primary Examiner* — Cheng Yuan Huang
(74) *Attorney, Agent, or Firm* — Stephen T. Scherrer; Monique A. Morneault; Scherrer Patent & Trademark Law, P.C.

(57) ABSTRACT

Sound-dampening material, including a base coat and a top coat, and a method for sound-dampening a surface, are described. The base coat includes about 20-50 percent rubber emulsion, about 10-20 percent carbonate filler, about 3-10 percent fire retardant, about 3-10 percent opacity filler, and about 10-64 percent of other components. The top coat includes about 40-80 percent of a rubber emulsion, about 10-20 percent of a carbonate filler, about 3-10 percent of a fire retardant, about 3-10 percent of an opacity filler, and about 0-44 percent of other components. The method includes applying a base coat to a desired thickness allowing the base coat to dry, then applying a top coat over the base coat to a desired thickness.

11 Claims, 2 Drawing Sheets

| Description | Estimated STC Rating | Wall Assembly |
|---|---|---|
| 3 5/8" metal studs, 5/8" gyp (2 layers total), No insulation | 38 - 40 | |
| 3 5/8" metal studs, 5/8" gyp (2 layers total), Batt insulation | 43 - 44 | |
| 2x4 stud, 5/8" gyp (2 layers total), Batt insulation | 34 - 39 | |
| Staggered studs, 5/8" gyp (2 layers total), Batt insulation | 46 - 47 | |
| 2x4 stud, 5/8" gyp (2 layers total), Resilient Channel, Batt insulation | 45 - 52 | |
| 3 5/8" metal studs, 5/8" gyp (3 layers total), Batt insulation | 39 - 40 | |
| 2x4 stud, 5/8" gyp (4 layers total), Batt insulation | 43 - 45 | |
| 2x4 studs, 5/8" gyp (4 layers total), Batt insulation | 44 - 45 | |
| 2x4 studs, 5/8" gyp (2 layers total), Batt insulation | 56 - 59 | |
| 2x4 studs, 5/8" gyp (3 layers total), Batt insulation | 59 - 60 | |
| 2x4 studs, 5/8" gyp (4 layers total), Batt insulation | 58 - 63 | |

*FIG. 2*

COATING MATERIAL FOR ACHIEVING SOUND-DAMPENING AND METHOD FOR THE SAME

RELATED APPLICATIONS

The subject application is a divisional of U.S. application Ser. No. 13/246,468, filed Sep. 27, 2011, and claims priority to U.S. Provisional Application No. 61/442,425, filed on Feb. 14, 2011 and incorporates each of these documents by reference.

TECHNICAL FIELD

The present invention relates to a method for providing a sound-dampened surface, such as a wall or ceiling, as well as a sound-dampening coating material.

BACKGROUND

The Sound Transmission Class (STC), is a recognized standard and is the most common sound isolation standard in use in North America today. The STC is a method established in 1961 for rating the "noise reduction" capabilities of walls over the frequency range of 125 - 4000 Hz, assuming that the noise the wall is trying to stop is generally even across the frequency spectrum. The rating is calculated b using a "contour" that is shifted up and down to the highest point where two conditions are satisfied. To calculate STC, one has to attain performance data, which is called transmission toss, from a certified laboratory. Once the transmission loss (TL) data is attained, STC can be calculated.

Some commonly accepted STC ratings for wall constructions are illustrated in FIG. 2.

Typical interior walls in newer home constructions, using 2 sheets of ½" drywall on either side of a wood stud frame, have an STC of about 33. When asked to rate the acoustical performance of these walls, people often describe them as being "paper thin." Accordingly, such wall constructions offer little in the way of sound-dampening or privacy.

Adding absorptive insulation (e.g., fiberglass batts) in the wall cavity usually increases the STC of typical walls to fall within the range of 36-39, depending on stud and screw spacing. Doubling up the drywall in addition to insulation can yield an STC rating in the range of about 41-45, provided the wall gaps and penetrations are sealed properly.

It is important to note that doubling the mass of a partition does not double the STC rating. Doubling the mass (e.g., going from two total sheets of drywall to four) typically adds only about 5-6 points to the STC rating. Breaking the vibration paths by decoupling the panels from each other will increase transmission loss much more effectively than simply adding more and more mass to a monolithic wall/floor/ceiling assembly.

Structurally decoupling the drywall panels from each other (by using resilient channel, steel studs, a staggered-stud wall, or a double stud wall) can yield an STC rating as high as 63 or more for a double stud wall, with good low-frequency transmission loss as well. Compared to the baseline wall of STC 33, an STC 63 wall will transmit only about 1/1000 as much sound energy, seem about 88 percent quieter and will render most frequencies inaudible. However, such wall assemblies can add a significant cost to the overall construction price.

Due to their high mass, concrete and concrete block walls have good TL values (STC ratings in the 40 s and 50 s for 4-8" thickness) but their weight, added complexity of construction and poor thermal insulation tend to limit them as viable materials in most residential wall construction, except in temperate climates and hurricane or tornado prone areas. Various insulation options can result in higher STC ratings, however, insulation tends to add little compared to other aspects of wall construction.

Materials which can improve the STC rating in walls include mass-loaded vinyl (MLV), standard drywall, "soundproof" drywall, such as QuietRock™, Supress™, SoundBreak™ and ComfortGuard™ or damping compounds such as Green Glue™. However, each of these products have drawbacks such as cost, complexity of application or construction, as well as other problems. The present material and disclosed methods solve these and other issues found in prior art sound-dampening.

SUMMARY

A sound-dampening coating material, including an individual base coat and a separate top coat, and a method for sound-dampening a surface by applying such material, is disclosed.

In an embodiment, the base coat material includes about 20 to about 50 percent by weight of a rubber emulsion, about 10 to about 20 percent by weight of a carbonate filler, about 3 to about 10 percent by weight of a fire retardant, about 3 to about 10 percent by weight of an opacity filler, and about 10 to about 64 percent by weight of other components for affecting characteristics of the base coat material.

In an embodiment, the top coat material includes about 40 to about 80 percent by weight of a rubber emulsion, about 10 to about 20 percent by weight of a carbonate filler, about 3 to about 10 percent by weight of a fire retardant, about 3 to about 10 percent by weight of an opacity filler, and about 0 to about 44 percent by weight of other components for affecting characteristics of the top coat material.

An embodiment of the application process includes the steps of applying a base coat material to a surface to a thickness in the range of from about 25 to about 30 mil, allowing the base coat to dry, then applying a top or finish coat material over the base coat to a thickness in the range of from about 7 to about 10 mil.

These and other embodiments of the material, individual coatings, and the application method are described in detail in the following specification as accompanied by the appended drawings.

BRIEF DESCRIPTION OF THE DRAWINGS

For the purpose of facilitating an understanding of the subject matter sought to be protected, there are illustrated in the accompanying drawing figures, embodiments thereof, from an inspection of which, when considered in connection with the following description, the subject matter sought to be protected, its construction and operation, and many of its advantages should be readily understood and appreciated.

FIG. 2 illustrates some commonly accepted STC ratings for wall constructions.

DETAILED DESCRIPTION

Figure 1:
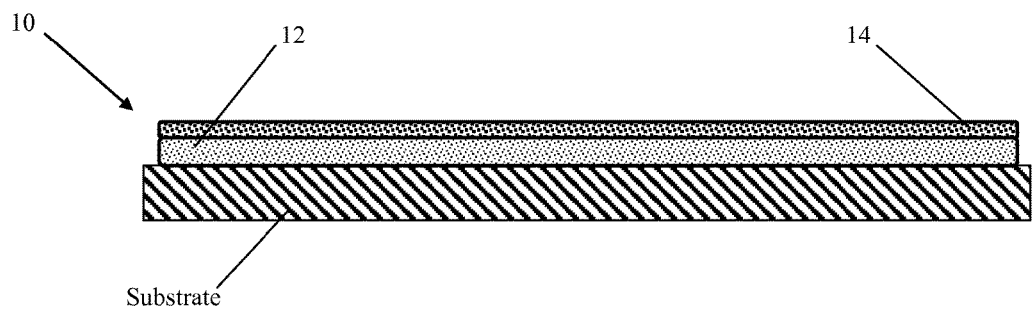
FIG. 1 is a cross section of a substrate coated with an embodiment of the sound-dampening of the present invention.

While this invention is susceptible of embodiments in many different forms, there is shown in the drawings, and will herein be described in detail, preferred embodiments of the invention with the understanding that the present disclosure is to be considered as an exemplification of the principles of the invention and is not intended to limit the broad aspect of the invention to embodiments illustrated.

The sound-dampening composition 10 of the present invention is preferably comprised of two coats, a base coat 12 and a top coat 14. With proper application, the disclosed composition 10 has the ability of raising the STC rating of a surface, such as a wall, ceiling, floor, etc., to provide needed sound-dampening. By "sound-dampening" it is meant that the transmission of "noise" over the frequency range of 125-4000 Hz, assuming a generally even frequency spectrum, is reduced as measured by a certified sound laboratory.

In independent testing by Riverbank Acoustical Laboratories of Geneva, Ill., an STC of 52 was measured on a wall comprised of two ⅝" gypsum board on insulated steel studs and properly coated with the disclosed sound-dampening composition. As indicated above, such a surface normally has an STC in the range of 43-44. The preferred composition 10 of the two separate coating layers, 12 and 14, are set forth in TABLE 2 (Base Coat 12) and TABLE 3 (Top Coat 14) below:

TABLE 2

Base Coat Formula-Preferred Composition

| Material | Weight Percentage (wt %) | Wt % Range | Commercial Product |
|---|---|---|---|
| Styrenated Butadiene Rubber Emulsion | 39.170 | 20-50 | CP-501 Emulsion |
| Defoamer | 0.500 | 0-2 | FGK Defoamer |
| Freeze/Thaw Additive | 0.500 | 0-2 | Propylene Glycol |
| Surfactant | 0.250 | 0-1 | Triton X-100 |
| Biocide | 0.200 | 0-1 | Nuosept 91 |
| Dispersant | 0.100 | 0-1 | Potassium Tripolyphosphate |
| Dispersant | 0.150 | 0-1 | Tamol 851 |
| Calcium Carbonate Filler | 15.000 | 5-25 | Atomite |
| Fire Retardant | 6.000 | 3-12 | Aluminum Trihydrate |
| Opacity Filler | 6.500 | 3-12 | 2300 Titanium Dioxide |
| Fungicide | 0.200 | 0-1 | Fungitrol 404D |
| Styrenated Acrylic Emulsion-Tackifier | 30.000 | 20-40 | SP-405 Emulsion |
| Pigment Dispersion | 0.250 | 0-1 | 8594 Carbon Black |
| Diluent | 0.425 | 0-1 | Water |
| Acrylic Emulsion Thickener | 0.650 | 0-2 | CP-590 Emulsion |
| pH Neutralization | 0.100 | 0-1 | AMP-95 |
| TOTAL | 100.00 | | |

TABLE 3

Top Coat Formula-Preferred Composition

| Material | Weight Percentage (wt %) | Wt % Range | Commercial Product |
|---|---|---|---|
| Styrenated Butadiene Rubber Emulsion | 67.400 | 55-75 | CP-501 Emulsion |
| Defoamer | 0.500 | 0-2 | FGK Defoamer |
| Freeze/Thaw Additive | 0.500 | 0-2 | Propylene Glycol |
| Surfactant | 0.250 | 0-1 | Triton X-100 |
| Biocide | 0.200 | 0-1 | Nuosept 91 |
| Dispersant | 0.100 | 0-1 | Potassium Tripolyphosphate |
| Dispersant | 0.150 | 0-1 | Tamol 851 |
| Calcium Carbonate Filler | 15.000 | 5-25 | Atomite |
| Fire Retardant | 6.000 | 3-12 | Aluminum Trihydrate |
| Opacity Filler | 6.500 | 3-12 | 2300 Titanium Dioxide |

TABLE 3-continued

Top Coat Formula-Preferred Composition

| Material | Weight Percentage (wt %) | Wt % Range | Commercial Product |
|---|---|---|---|
| Fungicide | 0.200 | 0-1 | Fungitrol 404D |
| Diluent | 2.450 | 1-4 | Water |
| Acrylic Emulsion Thickener | 0.650 | 0-2 | CP-590 Emulsion |
| pH Neutralization | 0.100 | 0-1 | AMP-95 |
| TOTAL | 100.00 | | |

Each of the two formulas is preferably comprised of solids in the range of from about 55% to about 70%, most preferably about 62% solids. The composition is mixed together thoroughly with all ingredients, as would be understood by those skilled in the art. While a broader range of the weight percentage of each ingredient is possible to produce a suitable sound-dampening material, the uniquely preferred composition set forth above is believed to provide the greatest sound-dampening when applied to a surface.

For example, a base coat 12 may have the following weight percentage variations while still producing suitable, though not necessarily optimal, sound-dampening characteristics: about 20 to about 50 percent by weight of a rubber emulsion; about 10 to about 20 percent by weight of a carbonate filler; about 3 to about 10 percent by weight of a fire retardant; about 3 to about 10 percent by weight of a opacity filler; and about 10 to about 64 percent by weight of other components for affecting characteristics of the base coat material.

Likewise, the top coat 14 may have the following weight percentage variations while still producing suitable, though not necessarily optimal, sound-dampening characteristics: about 40 to about 80 percent by weight of a rubber emulsion; about 10 to about 20 percent by weight of a carbonate filler; about 3 to about 10 percent by weight of a fire retardant; about 3 to about 10 percent by weight of a opacity filler; and about 0 to about 44 percent by weight of other components for affecting characteristics of the top coat material.

The "other components" for the base coat 12 include defoamer, freeze/thaw additive, surfactant, biocide, dispersant, fungicide, tackifier, pigment dispersion, diluent, thickener, and a pH adjuster. For the top coat 14, the "other components" are selected from the group consisting of defoamer, freeze/thaw additive, surfactant, biocide, dispersant, fungicide, diluent, thickener, and a pH adjuster.

FIG. 1 illustrates a surface coated with the present invention. For best results, the base coat 12 is applied to a clean dry surface to a preferred thickness in the range of from about 25 to about 30 mil., and the top or finish coat 14 is applied to a thickness in the range of from about 7 to about 10 mil. The thickness of the coatings should be tested when wet, as shrinkage does occur during drying.

The coatings, 12 and 14, are preferably applied by a commercial airless sprayer having a 3.17 to 3.19 mm spray tip to achieve a quality coverage of the surface, as such coverage may directly affect the sound-dampening quality of the material. However, where such a sprayer is impractical or unusable, each coating may be applied using a roller or brush. The user should be diligent in applying each coating, 12 and 14, across the complete surface and to the desired thickness.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A sound-dampening coating material comprising:
   a base coat material having an applied thickness in the range of from about 25 to about 30 mil, the base coat material having the following formula:
   20 to 40 percent by weight of a rubber emulsion; about 10 to about 20 percent by weight of a carbonate filler; about 3 to about 10 percent by weight of a fire retardant; about 3 to about 10 percent by weight of an opacity filler; and
   about 10 to about 64 percent by weight of other components for affecting characteristics of the base coat material;
   a top coat material applied over the base coat material to a thickness in the range of from about 7 to about 10 mil, the top coat material having the following formula:
   about 40 to about 80 percent by weight of a rubber emulsion; about 10 to about 20 percent by weight of a carbonate filler; about 3 to about 10 percent by weight of a fire retardant; about 3 to about 10 percent by weight of a opacity filler; and
   about 0 to about 44 percent by weight of other components for affecting characteristics of the top coat material.

2. The sound-dampening coating material of claim 1, wherein the other components for affecting characteristics of the base coat material are selected from the group consisting of defoamer, freeze/thaw additive, surfactant, biocide, dispersant, fungicide, tackifier, pigment dispersion, diluent, thickener, pH adjuster and the like.

3. The sound-dampening coating material of claim 2, wherein the freeze/thaw additive is propylene glycol.

4. The sound-dampening coating material of claim 2, wherein the dispersant is potassium tripolyphosphate.

5. The sound-dampening coating material of claim 2, wherein the diluent is water.

6. The sound-dampening coating material of claim 2, wherein the thickener is acrylic emulsion thickener.

7. The sound dampening coating material of claim 1, wherein the other components for affecting characteristics of the top coat material are selected from the group consisting of defoamer, freeze/thaw additive, surfactant, biocide, dispersant, fungicide, diluent, thickener, pH adjuster and the like.

8. The sound-dampening coating material of claim 1, wherein the rubber emulsion is a styrenated butadiene rubber emulsion.

9. The sound-dampening coating material of claim 1, wherein the carbonate filler is calcium carbonate.

10. The sound-dampening coating material of claim 1, wherein the fire retardant is aluminum trihydrate.

11. The sound-dampening coating material of claim 1, wherein the opacity filler is titanium dioxide.

* * * * *